Oct. 9, 1962          J. G. WOOD          3,057,200
                        PYROMETER

Filed May 12, 1961                      5 Sheets—Sheet 1

INVENTOR.
JOHN G. WOOD,
BY
ATTORNEY.

Oct. 9, 1962   J. G. WOOD   3,057,200
PYROMETER

Filed May 12, 1961   5 Sheets-Sheet 3

INVENTOR.
JOHN G. WOOD,
BY
ATTORNEY.

United States Patent Office 3,057,200
Patented Oct. 9, 1962

3,057,200
PYROMETER
John G. Wood, Los Angeles, Calif., assignor to Hughes Aircraft Company, Culver City, Calif., a corporation of Delaware
Filed May 12, 1961, Ser. No. 109,662
20 Claims. (Cl. 73—355)

This invention relates generally to systems for determining the temperature or other thermodynamic characteristics of an object, and particularly relates to a pyrometer for measuring the temperature of an object which may be opaque and reflecting, or transparent and nonreflecting, or partially transparent and partially reflecting.

In the prior art various types of pyrometers are known. For example, a color pyrometer is designed to measure the temperature of an object by determining the intensity of its radiation at two different wavelength regions. Such a two-color pyrometer is quite satisfactory for determining the temperature of an object provided the object is a black body or a so-called grey body. A grey body may be defined as a body having a radiation intensity over different wavelengths which generally follows Planck's laws except that the intensity of the radiation is less by a fixed fraction than that of a black body. However, if the object is a nongrey body and therefore has an intensity distribution over different wavelengths which does not follow Planck's law, a two-color pyrometer will not, in general, indicate the true temperature of the object.

Another type of pyrometer is the total radiation pyrometer. As the name indicates, the total radiation of the object is measured here. Conventionally, a total radiation pyrometer makes use of a black body which is used as a reference body. In one type of total radiation pyrometer the reference body is held at a fixed or standard temperature. The radiation intensity of the reference body and that of the object to be measured are compared after taking into account any differences in the distances between the reference body and its detector and the object and its detector. Again, the object is assumed to have a radiation distribution of either a black or a grey body.

Another type of total radiation pyrometer has been devised to overcome the disadvantages of the two pyrometers previously referred to. In this total radiation pyrometer the reference body and an opaque object are positioned in close proximity. As a result, when the temperature of the object and the black body are the same the body is substantially in an isothermal enclosure. In other words, the object is essentially in a black body environment. The reason for this arrangement is to insure that Kirchhoff's law is obeyed by the radiations emitted and reflected by the object. On the other hand, when the reference black body is not at the same temperature as the object then the sum of the energies emitted and reflected by the object are not numerically equal to that from a black body at the same temperature which is positioned in place of the object.

The radiation emitted by the black body is measured by a detector. Furthermore, by means of another detector the radiation emitted by the object, as well as the radiation of the black body reflected by the object are measured together. However, as pointed out before, it is essential for the operation of such a pyrometer that a black body environment be provided for the object. This in turn means that the black body must be in close proximity to the object. Under certain conditions this cannot be done. For example, if the object, the temperature of which is to be measured, is located in an induction furnace, it may be impossible to position the black body also in the induction furnace without disturbing the electric field created in the induction furnace and without adversely affecting the operation of the black body. Furthermore, there are definite limits as to the geometric relations between the object, the black body and the respective detectors.

Finally, in the above-described type of total radiation pyrometer the black body must generally be of relatively large size. Such a large black body has considerable thermal lag, and therefore it is not possible to measure the temperature of an object which changes very rapidly. Furthermore, many objects, the temperatures of which are to be measured, will change their emissivity or reflectivity or transmissivity, as the case may be, with changes in temperature or with imperfections of the object. For example, it may be desirable to measure the temperature of hot sheet metal as it issues from the rolling mill. The emissivity as well as the reflectivity of such an object may change rapidly due to oxidation of the surface of the metal or imperfections or impurities in the material.

It is, accordingly, an object of the present invention to provide a total radiation pyrometer for measuring the temperature of an object regardless of changes in emissivity, reflectivity or transmissivity.

Another object of the present invention is to provide a total radiation pyrometer for measuring the temperature of an object which may be opaque and reflecting, or transparent and nonreflecting, or partially transparent and partially reflecting.

A further object of the invention is to provide a pyrometer of the type described for measuring the temperature of an object by means of a reference body which may be either a black body or a grey body, and which is not affected by the distance between the reference body and the object or other geometrical factors.

Still another object of the invention is to provide a pyrometer of the type described which permits the utilization of a small reference body having a short thermal lag and which permits to have the reference body separated from the object by a relatively large distance to allow the determination of the temperature of an object in an environment which is not easily accessible.

The pyrometer of the present invention includes a reference body which may be a black body or a grey body. There is provided a first detector for measuring a portion of the energy radiated by the reference body. A second detector is positioned for measuring the emission of the object, the temperature of which is to be measured, as well as the radiation of the reference body reflected by the object.

In accordance with the present invention there is provided mechanism for segregating the reflected radiation from the emitted radiation of the object. This is accomplished by a chopper or other suitable interrupting means disposed in the path of the radiation of the reference body between the reference body and the object. As a result, the reflected radiation is modulated or interrupted and can be segregated from the emitted radiation by suitable electronic means. Thus there may be provided an amplifier channel responsive to the emitted radiation and another amplifier channel responsive to the reflected radiation. The two signals representative of the reflected and the emitted radiation are then added and compared to the signal representative of the radiation emitted by the reference body.

It is now possible to adjust the gains of the amplifier channels by calibration so that the sum of the signals representing the reflected and the emitted radiation equals the signal of the reference body radiation whenever the temperature of the reference body equals that of the object.

It is also feasible with the pyrometer of the present invention to measure the temperature of an object which is transmitting but nonreflecting. Finally, it is also possible to measure the temperature of an object which is partially transmitting and partially reflecting.

The novel features of this invention, as well as the invention itself, both as to its organization and method of operation may best be understood when considered in the light of the following description, when taken in connection with the accompanying drawings, in which the same reference characters designate the same elements throughout the figures, and in which.

Figure 1:
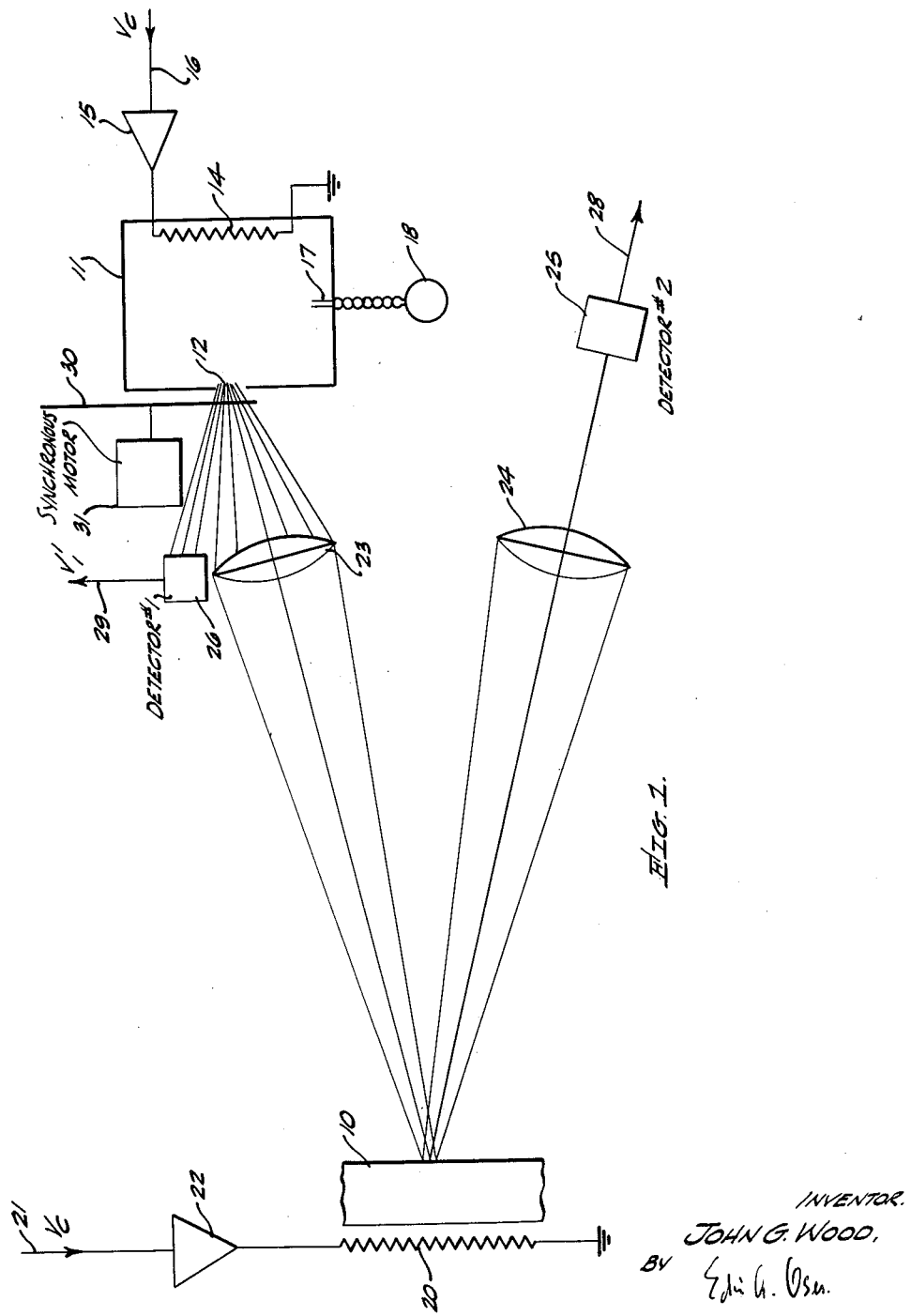
FIG. 1 is a schematic diagram of a pyrometer for measuring the temperature of an opaque, reflecting object in accordance with the present invention.

Referring now to the drawings and particularly to FIG. 1, there is illustrated a pyrometer for measuring the temperature of an object 10. The object 10 in the pyrometer of FIG. 1 is an opaque object which is partially reflecting. For example, the object 10 may be a sheet of metal or any other opaque material which is partially reflecting. The object may be either stationary or may be moving, such as a metal sheet issuing from a rolling mill. In order to measure the temperature of the object 10 there is provided a reference body 11 schematically indicated. The reference body 11 may either be a black body or a grey body and may be relatively small so as to have a small thermal lag. For the operation of the pyrometer of the invention it is immaterial whether the reference body 11 is black or grey. However, it is preferred to utilize a black body because black bodies can be readily constructed with the required degree of accuracy.

The reference body 11 has an opening 12 from which the radiation emanates. The reference body 11 may be heated by a suitable heater 14 which may be a resistance wire or preferably a material which exhibits the Peltier effect, that is, which becomes either hot or cold depending upon the direction of current flowing therethrough. The heating or cooling element 14 may be connected to an amplifier 15 receiving signals from a lead 16. One terminal of the heating and cooling element 14 may be grounded, as shown. Furthermore, a thermocouple 17 may be disposed in the reference body 11 to measure the temperature thereof. The temperature of the black body may be read from the instrument 18 which may, for example, be a calibrated voltmeter so that temperature may be directly read from the instrument.

The object 10 may also include a heating or cooling element 20 which may again be a resistance wire or a material exhibiting the Peltier effect. By means of the heating or cooling element 20 the temperature of the object 10 may be controlled, if desired. The temperature of the element 20 may be controlled by a signal impressed on the lead 21 which is coupled to the element 20 through an amplifier 22. The free terminal of the element 20 may be grounded, as shown.

By means of a suitable optical system 23 a portion of the radiation issuing from the aperture 12 of the reference body 11 is projected onto the object 10. Since the object is opaque and reflecting, the radiation of the reference body is reflected and may be focused by another optical system 24 on a detector 25. Furthermore, another portion of the radiation of the reference body 11 is directed onto a detector 26 which has been indicated as detector #1, while the detector 25 has been identified as detector #2.

It will be understood that the optical systems 23 and 24 should be made of a suitable material to transmit the radiation over the necessary wavelength region. Thus, depending upon the temperature to be measured the optical systems 23 and 24 should be transparent to radiations in the visible, or near infrared, or far infrared regions. Similarly, the detectors 25 and 26 should have such properties that they will detect radiation in the wavelength regions corresponding to the temperatures to be measured. Since it is desirable to measure the total radiation, the detectors 25 and 26 may, for example, be bolometers which change their resistance in accordance with the intensity of the radiation falling thereon in the manner of a thermistor. Alternatively, the detectors 25 and 26 may consist of a thermopile. Finally, depending upon the temperature ranges expected conventional infrared detectors will be used, such as a lead sulfide cell. However, it is important that the two detectors have matched characteristics. In other words, they should have the same relative response to wavelengths of the same intensity.

In accordance with the present invention there is provided mechanism for segregating the radiation emitted by the object 10 from the radiation radiated by the black body 11 and reflected from the object 10. Both the emitted and reflected radiation fall on the detector #2. In order to segregate these two radiations there may be provided a chopper 30 interposed into the path of the radiation from the black body 11. This chopper may be driven by a synchronous motor 31. Instead of a chopper 30 it is also feasible to provide a variable density filter so that the radiation of the black body is not interrupted but modulated. The only difference is that the signal obtained from the output lead 28 of detector 25 is more in the nature of an alternating current signal rather than pulses which would be obtained if a chopper were used.

The radiation radiated by the reference body 11 and received by the detector 26 may also be chopped or modulated although this is not necessary. As will become more apparent hereinafter, it is more convenient if the output signal of detector 26 obtained from output lead 29 is modulated or periodically interrupted.

Figure 2:
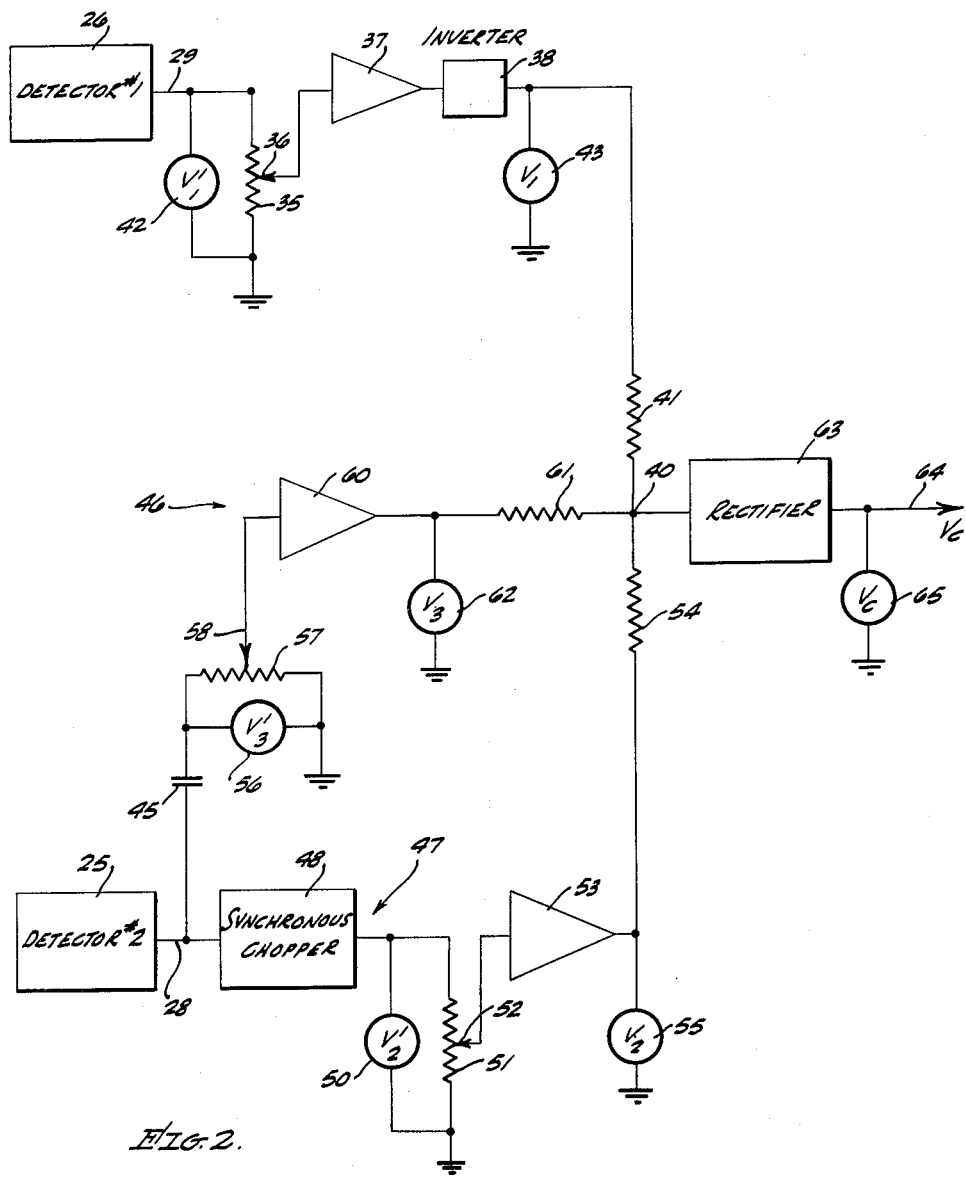
FIG. 2 is a circuit diagram, partly in block form, of an electronic circuit suitable for use with the pyrometer of the invention.

Before explaining the operation of the pyrometer of FIG. 1, reference is now made to FIG. 2 which illustrates an electronic circuit which may be used with the pyrometer of FIG. 1. In the circuit of FIG. 2 there are illustrated detectors 25 and 26. The output lead 29 of detector 26 is connected to ground through a resistor 35 having an adjustable arm 36 to derive an output signal of adjustable magnitude. This output signal is then amplified by amplifier 37, inverted by inverter 38 and connected to a junction point 40 through a summing resistor 41. Preferably, a voltmeter 42 is connected between output lead 29 and ground. This voltmeter measures the voltage $V_1'$ which is the detected radiation radiated by the reference body 11, and which will hereinafter be referred to as $h$. Similarly, another voltmeter 43 may be connected between the output of inverter 38 and ground to measure a voltage $V_1$. The significance of this voltage will be explained hereinafter.

As set forth hereinbefore, the detector 25 receives both the radiation emitted by the object and the radiation of the reference body reflected by the object. It will be recalled that the reflected radiation is modulated or interrupted while, of course, the emitted radiation is continuous. Therefore, the electric signals representative of these reflected and emitted radiations may be readily segregated. A capacitor 45 is connected to the output lead 28 of detector 25 and will only pass alternating current or interrupted electric signals. Therefore, the amplifier channel generally indicated at 46 is responsive to the reflected radiation. The other amplifier channel 47 can be made responsive only to the emitted radiation. To this end there may be provided an electronic synchronous chopper 48 connected to the detector output lead 28. The synchronous chopper 48 is synchronized with the synchronous motor 31 driving the chopper 30. The phasing of the synchronous chopper 48 is such that electric signals are passed by the chopper 48 only when no reflected radiation impinges on detector 25. As a result, amplifier channel 47 is responsive only to the emitted radiation. A voltmeter 50 is connected between the output of synchronous chopper 48 and ground. This voltmeter 50 measures a voltage $V_2'$ which indicates the detected, emitted radiation of the object and will hereinafter be referred to as $e$. In order to adjust the gain of the amplifier channel 47 there is provided a resistor 51 connected between the output of synchronous chopper 48 and ground having an adjustable arm 52 connected in turn to an amplifier 53. The output of amplifier 53 is connected to the junction point 40 through a summing resistor 54. Furthermore, there may be provided a voltmeter 55 between the output of the amplifier 53 and ground. The voltmeter 55 measures a voltage $V_2$, the significance of which will be explained hereinafter.

Similarly, the amplifier channel 46 includes a voltmeter 56 connected between the output of capacitor 45 and ground. The voltmeter 56 measures a voltage $V_3'$ which is representative of the detected, reflected radiation and which will hereinafter be referred to by $r$. A resistor 57 is connected between the output of capacitor 45 and ground and has an adjustable arm 58 for controlling the gain of the amplifier channel. The adjustable arm 58 is connected to the junction point 40 through an amplifier 60 and a summing resistor 61. A voltmeter 62 may be connected between the output of amplifier 60 and ground to measure a voltage $V_3$ as will be explained hereinafter.

Preferably there is connected a rectifier and smoothing circuit 63 to the junction point 40 to develop a direct current output voltage which may be obtained from output lead 64. This output voltage may be utilized as a control voltage $V_c$ and its value may be measured by the voltmeter 65 connected between output lead 64 and ground.

The operation of the pyrometer of the invention as illustrated in FIGS. 1 and 2 will now be described. The radiation of the reference body 11 falls on detector 26 to develop an electric output signal on output lead 29. At the same time detector 25 receives the radiation emitted by the object 10 as well as that reflected by the object. An electric output signal is developed on output lead 28 which represents the sum of the emitted and reflected radiations.

The magnitude of the output signal from detector 26 may be adjusted by the movable arm 36 and is then amplified by amplifier 37 and inverted by inverter 38 and added through the summing resistor 41 and appears at junction point 40.

Similarly, the interrupted or alternating current signal representative of the reflected radiation is segregated from the direct current signal representative of the emitted radiation by capacitor 45. This signal which now represents solely the reflected radiation may have its magnitude adjusted by adjustable arm 58, is amplified by amplifier 60, and is added by summing resistor 61 to the other signals at the junction point 40.

Finally, the emitted radiation is segregated from the interrupted or chopped reflected radiation by synchronous chopper 48. As explained hereinbefore, the chopper 48 has such a phase that it will only transmit signals when no radiation is reflected by the object. The magnitude of this signal may again be adjusted by the adjustable arm 52, is then amplified by amplifier 53, and added to the other signals by means of summing resistor 54 and appears at the junction point 40.

It will be noted that the reflected signal is periodically interrupted in the form of an alternating current signal. Similarly, the emitted signal is also interrupted by synchronous chopper 48. For this reason it may be more convenient to have the signal corresponding to the radiated energy of the black body also in the form of an alternating signal. This may most conveniently be effected by positioning the detector 26 between the reference body 11 and the chopper 30. Alternatively, it is feasible to include an electronic chopper which need not be synchronized into the amplifier channel of detector #1.

It can be shown from Kirchhoff's law that the following equation holds true for any opaque, reflecting object:

$$K_1 h = K_2 e + K_3 r \qquad (1)$$

This equation can be transformed into the following form:

$$k_1 e + k_2 r - h = 0 \qquad (2)$$

In the above equations $e$ and $r$ have already been defined as the detected radiation emitted and reflected by the object while $h$ is detected radiation of the reference body $K_1$, $K_2$, and $K_3$ are constants, while $k_1$ and $k_2$ are different constants.

It will be apparent from Equation 2 that there is one equation with two unknowns, namely, the constants $k_1$ and $k_2$. Once the values of these two constants have been obtained for any particular setup of the pyrometer, it is then possible to calibrate the pyrometer whereafter the temperature of an object may be measured. For this calibration the following two equations must be solved:

$$h_1 = k_1 e_1 + k_2 r_1 \qquad (3)$$
$$h_2 = k_1 e_2 + k_2 r_2$$

The two simultaneous Equations 3 can be solved by simply determining these two equations for two different conditions at each of which the temperature of the black body equals that of the object. It must be assumed for these two different measurements that the reflectivity and the emissivity of the object changes or else the equations cannot be solved. It will be evident from an inspection of Equation 2 that the radiation $h$ radiated by the black body may be assumed to be constant.

This calibration may be effected as follows: The voltages $V_1'$, $V_2'$, and $V_3'$ indicate respectively the quantities $h$, $e$, and $r$. The constants $K_1$, $K_2$, and $K_3$ may be adjusted by an adjustment of the movable arms 36, 52, and 58. Of course, as pointed out before the arm 36 may be maintained constant. The desired voltages which are needed to effect the calibration are the voltages $V_1$, $V_2$, and $V_3$ which are measured by the voltmeters 43, 55, and 62. These voltages respectively correspond to $h$, $k_1 e$ and $k_2 r$. The values of the constants may readily be obtained by calculation; that is, by solving Equations 3. Then by proper adjustment of the movable arms the voltages $V_1$, $V_2$, and $V_3$ can be made such as to correspond to the desired voltages. Thereafter the pyrometer is ready for operation and the temperature of any object can be measured as long as the setup of the pyrometer remains unchanged.

It will be apparent from an inspection of Equations 3 that for calibration purposes both the emissivity and the reflectivity must change for the two measurements required. Otherwise, in Equations 3 $h_1 = k_1 e_1 + k_2 r_1$ and $h_2 = a(k_1 e_1 + k_2 r_1)$, where $a$ is a constant, so that there are no longer two independent equations.

In general, the pyrometer of FIGS. 1 and 2 may be used for determining the temperature of the object 10. The temperature of the reference body 11 is adjusted until Equation 2 balances. At that time the temperatures of the object and of the reference body are equal, and the temperature of the reference body is determined by the thermocouple 17 and the instrument 18. The temperature of the reference body 11 may of course be adjusted by hand by varying the polarity and amplitude of the current flowing through the heater element 14. Alternatively, the control voltage $V_c$ obtained from output lead 64 may be impressed on lead 16 to effect automatic control of the temperature of the reference body. This control may be effected in any conventional manner.

Alternatively, the pyrometer of the invention may be utilized for controlling the temperature of the object 10. In that case, the temperature of the object may be manually controlled by the proper choice of the polarity and amplitude of the current flowing through the heater element 20. Or else the control voltage $V_c$ obtained from lead 64 may be impressed on lead 21. In this manner the temperature of the object 10 may be kept at any desired value which equals that of the reference body.

In the electronic circuit of FIG. 2 the signals representative of the reflected and emitted radiations were segregated in the amplifier channel 46 by means of the synchronous chopper 48. However, the two signals representative of the emitted and reflected radiations can also be segregated in the manner illustrated in FIG. 3 to which reference is now made.

Figure 3:
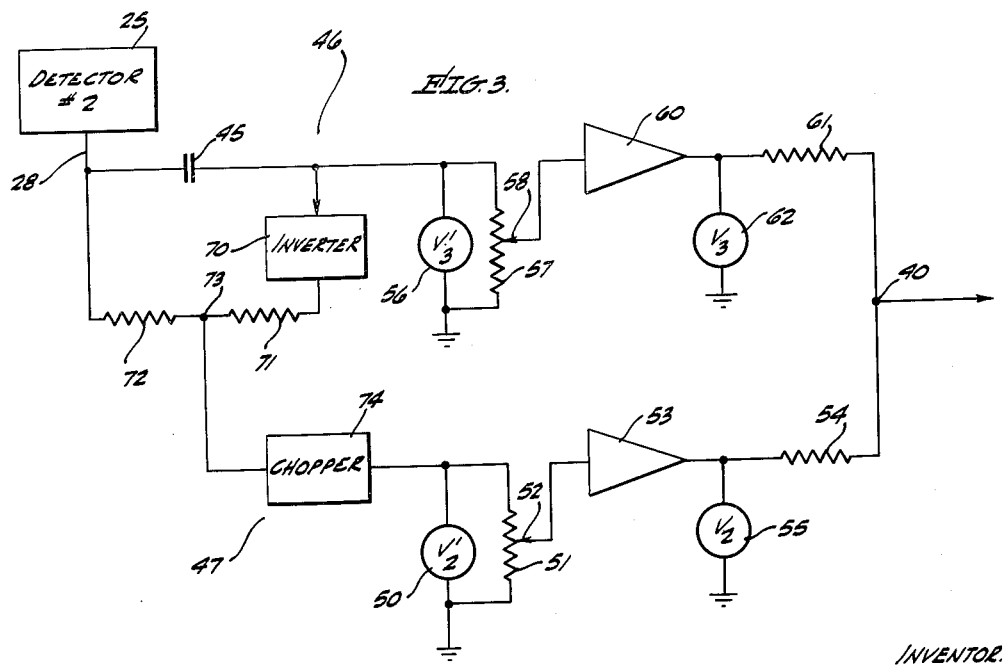
FIG. 3 is a circuit diagram, partly in block form, of a modified electronic circuit which may be substituted for a portion of the circuit of FIG. 2.

The circuit of FIG. 3 makes use of the fact that in the amplifier channel 47 there is translated a signal which is the sum of the emitted and reflected energies. On the other hand, the signal in the channel 46 represents only the reflected energy. Hence, it is feasible to subtract the signal representative of the reflected energy only from the other signal which is the sum of the emitted and reflected energies so that the difference signal represents only the emitted energy. To this end there is provided an inverter 70 which is provided in the output of capacitor 45. The output of the inverter 70 is the negative signal representing the reflected energy. This negative signal is now added to the total signal developed by detector 25. To this end a summing resistor 71 is connected to the output of inverter 70, while another summing resistor 72 is connected to the output of detector 25. Hence, at the junction point 73 of the two summing resistors 71, 72 there appears a signal representative of the emitted energy only.

Preferably there is provided an electronic chopper 74 in the amplifier channel 47 to provide a chopped or alternating signal. However, the chopper 74 need not be synchronized with the chopper 30.

The remainder of the amplifier channels 46 and 47 are the same as those of the circuit of FIG. 2 and need not be described again. It will, however, be understood that at the junction point 40 there may be connected the summing resistor 41 to subtract the signal representative of the radiated energy as explained hereinbefore.

The operation of the circuit of FIG. 3 is the same as that of FIG. 2 and need not be described again here. It should be noted that the calibration of a pyrometer including the circuit of FIG. 3 is the same as that previously described.

The pyrometer of the present invention also permits to measure the temperature of an object which is nonreflecting and transparent. Examples of such objects are gases which normally do not reflect, as well as certain glasses which have been treated to be nonreflecting.

Figure 4:
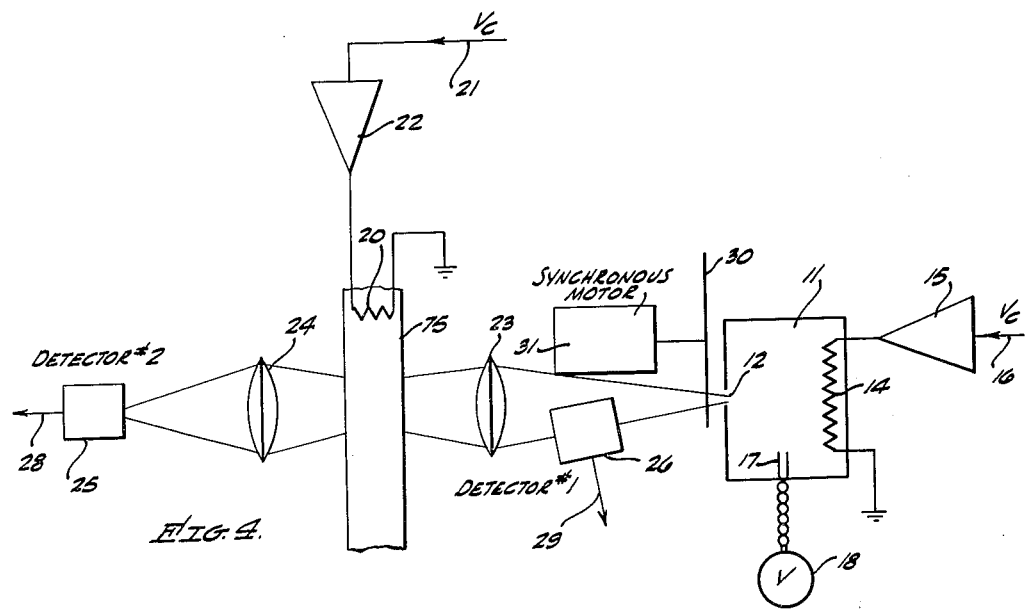
FIG. 4 is a schematic diagram of a pyrometer for measuring the temperature of a transparent, nonreflecting object in accordance with the invention.

A pyrometer for measuring a nonreflecting, transparent object has been illustrated in FIG. 4. The object is designated by reference number 75. Again, there is provided a reference body 11, a portion of the radiation of which is detected by the detector 26. However, the second detector 25 is disposed behind the object 75 and is responsive to the energy of the reference body transmitted by the object and to the energy emitted by the object. Therefore, the lens systems 23 and 24 are disposed to project the radiation of the reference body 11 on the object 75 and then to project the transmitted energy on the detector 25.

Otherwise, the pyrometer of FIG. 4 is essentially the same as that of FIG. 1. It will also be understood that the electronic circuit of FIG. 2 may be used with the pyrometer of FIG. 4. The only difference now is that the amplifier channel 46 translates a signal representative of the transmitted energy rather than of the reflected energy as was the case in the embodiment of FIG. 1. Similarly, the electronic circuit of FIG. 3 may be substituted for a portion of the circuit of FIG. 2 as previously explained.

For the pyrometer of FIG. 4 the following equation holds true:

$$K_1 h = K_2 e + K_3 t \quad (4)$$

In the above equation $t$ indicates the transmitted energy. As explained hereinbefore, Equation 4 can be transformed as follows:

$$k_1 e + k_2 t - h = 0 \quad (5)$$

The calibration of the pyrometer of FIG. 4 may be effected in essentially the same manner as set forth hereinbefore. Again, two simultaneous equations have to be solved which are based on Equation 5. It will be understood that either the temperature of the reference body 11 or that of the object 75 may be controlled by hand or automatically in the manner previously disclosed.

While the embodiment of the invention of FIG. 1 permits to measure the temperature of an object which is opaque and partially reflecting, while that of FIG. 4 permits to measure the temperature of an object which is transparent and nonreflecting, it is also feasible in accordance with the present invention to measure objects which are both transparent and reflecting. Examples of such objects are reflecting glasses, transparent plastics or thin metallic films which are at least partially transparent.

Figure 5:
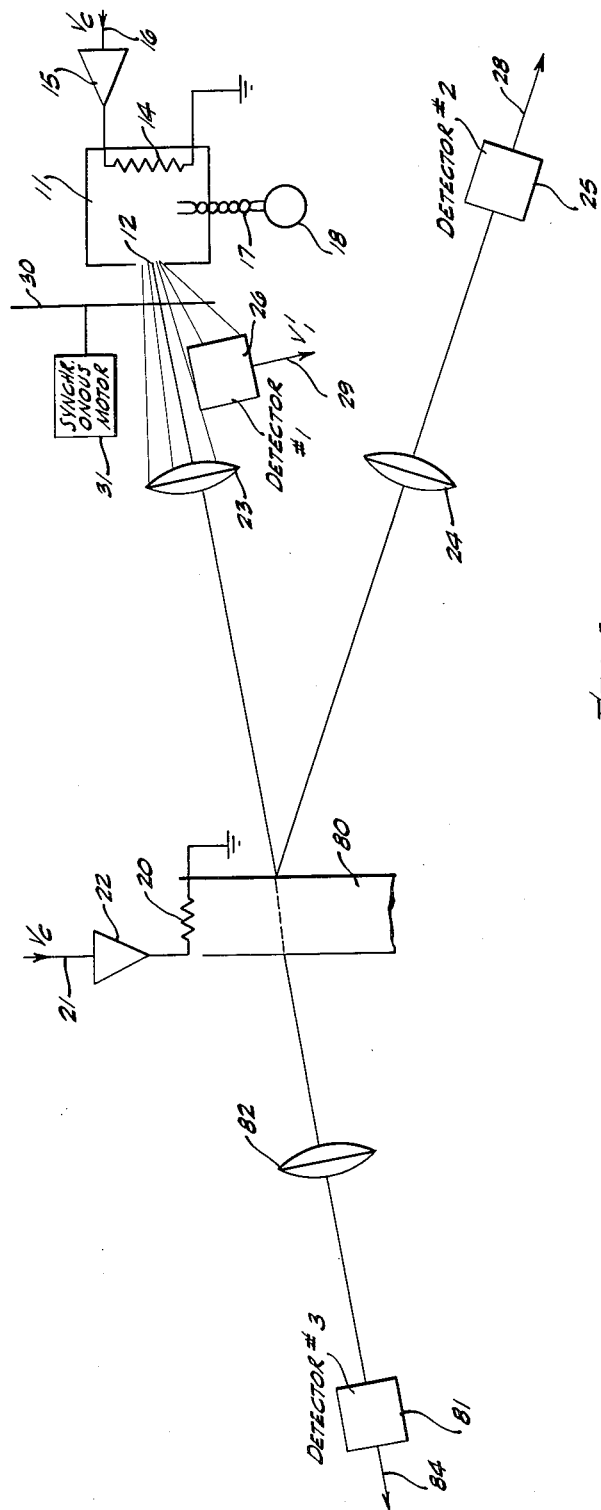
FIG. 5 is a schematic diagram of a pyrometer of the invention for measuring the temperature of a partially transparent, partially reflecting object.

Such a pyrometer is illustrated in FIG. 5. There is shown an object 80 which is partially transparent and partially reflecting. As in the previous embodiments of the invention there is again provided a reference body 11 and a first detector 26 receiving a portion of the radiation from the reference body. The lens system 23 projects another portion of the energy of the reference body onto the object 80. Again, the lens system 24 projects the energy reflected by the object as well as a portion of the energy emitted by the object onto detector 25. A third detector 81 is provided. A lens system 82 projects energy radiated by the reference body 11 and transmitted by the object 80 onto detector 81. The detector 81 has an output lead 84 on which an output voltage $V_4'$ appears. This voltage represents $t$, that is, the transmitted energy. Otherwise, the pyrometer of FIG. 5 is the same as that of FIG. 1.

Figure 6:
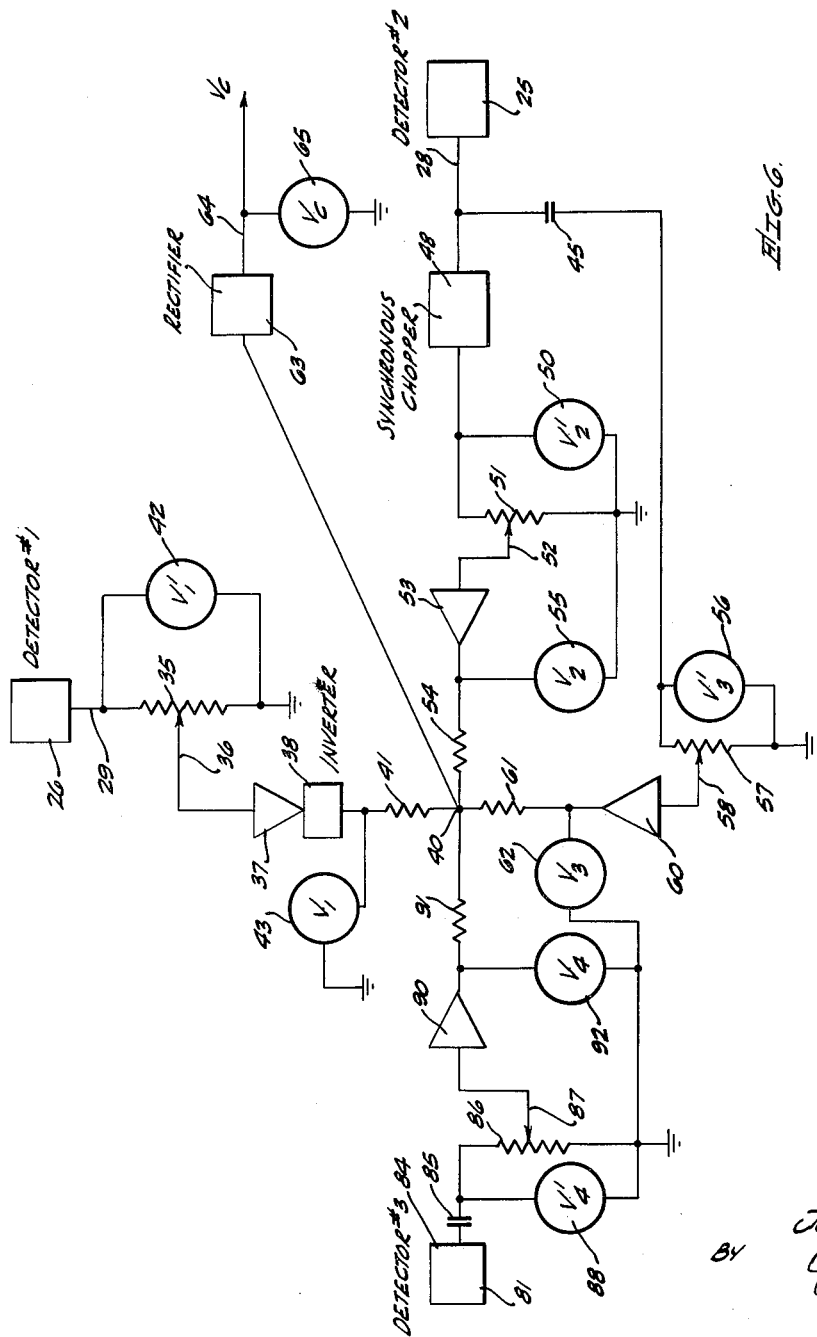
FIG. 6 is a circuit diagram, partly in block form, of an electronic circuit suitable for use with the pyrometer of FIG. 5.

The electronic circuit of FIG. 6 is suitable for use with the pyrometer of FIG. 5. The amplifier channel for detector 26 is the same as illustrated in FIG. 2. The same is true of the two amplifier channels coupled to the detector 25. Detector 81 has a capacitor 85 coupled to its output lead 84. The purpose of the capacitor 85 is to reject any direct current signal which may be caused by the emission of the object 80. A resistor 86 is connected between the output of capacitor 85 and ground and has a variable arm 87 for adjusting the signal amplitude. A voltmeter 88 is connected between the output of capacitor and ground and measures a voltage $V_4'$ which represents $t$, the transmitted radiation. An amplifier 90 is connected to the adjustable arm 87 and its output is connected to the junction point 40 through another summing resistor 91. A voltmeter 92 is connected between the output of amplifier 90 and ground. The voltmeter 92 measures the voltage $V_4$, as will be explained more fully hereinafter.

It can again be proven mathematically from Kirchhoff's law that the following equation holds true:

$$K_1 h = K_2 e + K_3 r + K_4 t \quad (6)$$

This equation can again be transformed into the following equation:

$$k_1 e + k_2 r + k_3 t - h = 0 \quad (7)$$

In the manner explained previously the voltages $V_1'$, $V_2'$ $V_3'$, and $V_4'$ stand respectively for the quantities $h$, $e$, $r$, and $t$. Similarly, the voltages measured by the voltmeter 43, 55, 62, and 92 stand for the following quantities: $V_1=h$, $V_2=k_1e$, $V_3=k_2r$, and $V_4=k_3t$.

It will now be apparent that the pyrometer of FIG. 5 can be calibrated substantially in the same manner as described before. In this case, however, since there are three unknowns in Equation 7, it is necessary to make measurements at three different conditions of the object at each of which the temperature of the reference body 11 and that of the object 80 are equal. It will also be apparent that the emissivity, the reflectivity and the transmissivity must be different for the three calibration measurements. From these measurements the values of the constants $k_1$, $k_2$, and $k_3$ may be found and then the movable arms 52, 58, and 87 may be adjusted. In this manner the voltages $V_2$, $V_3$, and $V_4$ are adjusted to make Equation 7 balance and the pyrometer is ready for use.

As explained hereinbefore it is either feasible to control the temperature of the reference body 11 or that of the object 80. In the first case, the temperature of the object 80 is measured. In the second case, the temperature of the object 80 is maintained at a desired value. Adjustment of the temperatures of either the reference body or the object may be effected either manually or automatically in the manner previously outlined. Furthermore, it will be apparent that the circuit of FIG. 3 may be substituted for the two amplifier channels coupled to detector 25 of FIG. 6, as explained before.

It can be shown that if $h$ is larger than the sum of $k_1e$, $k_2r$, and $k_3t$, the temperature of the reference body is higher than that of the object. By referring to Equation 7 it will be found that in that case the left-hand portion of the equation assumes a negative value. The corresponding negative control signal $V_c$ may be used to lower the temperature of the reference body to make the equation balance again. On the other hand, if $h$ is smaller than the sum of $k_1e$, $k_2r$, and $k_3t$, the temperature of the reference body is less than that of the object. In that case the left-hand portion of Equation 7 assumes a positive value. The corresponding positive control signal $V_c$ may be used to raise the temperature of the black body until the equation balances again.

In the embodiment of the pyrometer of FIGS. 5 and 6 it has been assumed that the detector 25 is responsive to the emitted radiation from the object 80. It will be apparent that it is also feasible to measure the emitted radiation by the detector 81. In that case, all that is necessary is to exchange detectors 25 and 81 in the circuit of FIG. 6. However, it is preferred to measure the emitted radiation by means of detector 25. In that case, the pyrometer of FIG. 5 can be used for measuring not only the temperature of an object which is partially transparent and partially reflecting but also that of an object which is opaque and reflecting, as well as that of an object which is non-reflecting and transparent.

It is also feasible to determine the emissivity E of an object. The emissivity is given by the following equation:

$$E = \frac{K_1 e}{h} \tag{8}$$

Accordingly, the emissivity may be readily determined by dividing the voltage $V_2$ by the voltage $V_1$. Similarly, the apparent reflectivity R of an object is determined by the following equation:

$$R = \frac{k_2 r}{h} \tag{9}$$

Thus in order to obtain the apparent reflectivity, all that is necessary is to divide the voltage $V_3$ by the voltage $V_1$. Finally, the apparent transmissivity T is obtained by the following equation:

$$T = \frac{k_3 t}{h} \tag{10}$$

From the above it will be obvious that the apparent transmissivity is obtained by dividing voltage $V_4$ by the voltage $V_1$.

There has thus been disclosed a total radiation pyrometer which permits to measure the temperature of an object which may be opaque and reflecting, or transparent and nonreflecting, or partially reflecting and partially transparent. Furthermore, it is possible by a suitable calibration to take care of any geometrical relationship between the reference body, the object and the detector. It is immaterial whether the reference body is a black body or a grey body, and it is not necessary to have a black body environment for the object, the temperature of which is to be measured. Thus, if the object should be in an induction furnace, the reference body may conveniently be located outside the induction furnace and the temperature of the object can be readily measured as long as there is enough radiation available at the detector to develop an output signal sufficient to overcome noise.

I claim:

1. A pyrometer for measuring the temperature of an object comprising a reference body, a first detector, means for directing a portion of the energy radiated by said reference body onto said first detector, means for directing another portion of the radiation of said reference body onto said object, a second detector, means for directing the radiation of said reference body reflected by said object and radiation emitted by said object onto said second detector, mechanism for segregating said reflected radiation from said emitted radiation comprising chopper means disposed in the path of the radiation of said reference body between said reference body and said object for periodically interrupting said reference body radiation, a first amplifier channel coupled to said first detector, a second and a third amplifier channel coupled to said second detector, said second amplifier channel being responsive to the alternating signal developed by said interrupted and reflected radiation, said third amplifier channel being responsive to the direct current signal developed by said emitted radiation, means for adjusting independently the gains of said amplifier channels, and means for adding the signals of said second and third amplifier channels, whereby the gains of said amplifier channels can be adjusted so that the signal from said first amplifier channel equals the sum of the signals of said second and third amplifier channel when the temperature of said reference body equals that of said object.

2. A pyrometer as defined in claim 1 wherein means are provided coupled to said reference body for measuring the temperature thereof.

3. A pyrometer as defined in claim 1 wherein an inverter is coupled to said first amplifier channel, and means coupling said inverter to said means for adding the signals of said second and third amplifier channels whereby the sum of the signal of said amplifier channels is zero when the temperature of said reference body equals that of said object.

4. A pyrometer as defined in claim 1 wherein a synchronous, electronic chopper is provided in said third amplifier channel, said electronic chopper being synchronized with said chopper means disposed in the radiation path of said reference body so that the signal of said third amplifier channel represents substantially only said emitted radiation.

5. A pyrometer as defined in claim 1 wherein an inverter is provided in said second amplifier channel, and summing means coupled to said inverter and to said third amplifier channel for adding the inverted signal of said second amplifier to that of said third amplifier channel, whereby the output signal developed by said third amplifier channel represents substantially only said emitted radiation.

6. A pyrometer as defined in claim 5 wherein an electronic chopper is provided in said third amplifier channel.

7. A pyrometer as defined in claim 1 wherein said object is reflecting and opaque.

8. A pyrometer for measuring the temperature of an object comprising a reference body, a first detector, means for directing a portion of the energy radiated by said reference body onto said first detector, means for directing another portion of the radiation of said reference body onto said object, a second detector, means for directing the radiation of said reference body reflected by said object and radiation emitted by said object onto said second detector, mechanism for segregating said reflected radiation from said emitted radiation comprising interrupting means disposed in the path of the radiation of said reference body between said reference body and said object for periodically interrupting the radiation of said reference body, a first amplifier channel coupled to said first detector, an inverter coupled to said first amplifier channel, a second and a third amplifier channel coupled to said second detector, said second amplifier channel being responsive to the alternating signal developed by said interrupted and reflected radiation, said third amplifier channel being responsive to the direct current signal developed by said emitted radiation, means for adjusting independently the gains of said second and third amplifier channels, summing means for adding the signals from said inverter and from said second and third amplifier channels, whereby the gains of said second and third amplifier channels can be adjusted so that the output signal from said summing means becomes zero when the temperature of said reference body equals that of said object.

9. A pyrometer as defined in claim 8 wherein means are provided associated with said reference body for controlling the temperature thereof, and means coupled to said summing means and to said means for controlling the temperature of said reference body for adjusting the temperature thereof until said output signal becomes zero.

10. A pyrometer as defined in claim 8 wherein means are provided associated with said object for controlling the temperature thereof, and means coupled to said summing means and to said controlling means for adjusting the temperature thereof until said output signal becomes zero.

11. A pyrometer for measuring the temperature of a nonreflecting, transparent object comprising a reference body, a first detector, means for directing a portion of the energy radiated by said reference body onto said first detector, means for directing another portion of the radiation of said reference body onto said object, a second detector, means for directing the radiation of said reference body transmitted by said object and radiation emitted by said object onto said second detector, mechanism for segregating said transmitted radiation from said emitted radiation comprising interrupting means disposed in the path of the radiation of said reference body between said reference body and said object for periodically interrupting said reference body radiation, a first amplifier channel coupled to said first detector, a second and a third amplifier channel coupled to said second detector, said second amplifier channel being responsive to the alternating signal developed by said interrupted and transmitted radiation, said third amplifier channel being responsive to the direct current signal developed by said emitted radiation, means for adjusting independently the gains of said amplifier channels, and summing means for adding the signals of said second and third amplifier channels, whereby the gains of said amplifier channels can be adjusted so that the signal from said first amplifier channel equals the sum of the signals of said second and third amplifier channel when the temperature of said reference body equals that of said object.

12. A pyrometer as defined in claim 11 wherein an inverter is coupled to said first amplifier channel, and means coupled to said inverter and to said summing means for adding the signals of said amplifier channels, whereby the sum of the signals of said amplifier channels is zero when the temperature of said reference body equals that of said object.

13. A pyrometer for measuring the temperature of a partially transparent, partially reflecting object comprising a reference body, a first detector, means for directing a portion of the energy radiated by said reference body onto said first detector, means for directing another portion of the energy radiated by said reference body onto said object, a second detector, means for directing the energy of said reference body reflected by said object onto said second detector, a third detector, means for directing the energy of said reference body transmitted by said object onto said third detector, a first amplifier channel coupled to said first detector, a second amplifier channel coupled to said second detector, a third amplifier channel coupled to one of said second and third detectors, a fourth amplifier channel coupled to said third detector, means for segregating said reflected radiation from said emitted radiation including chopper means interposed into the path of the radiation between said reference body and said object for periodically interrupting said reference body radiation, said second amplifier channel being responsive to the alternating signal developed by said interrupted and reflected radiation, said third amplifier channel being responsive to the direct current signal developed by said emitted radiation, means for adjusting independently the gains of said amplifier channels, and summing means for adding the signals of said second, third, and fourth amplifier channel, whereby the gains of said amplifier channels can be adjusted so that the signal of said first amplifier channel equals the sum of the signals of said second, third and fourth amplifier channel when the temperature of said reference body equals that of said object.

14. A pyrometer as defined in claim 13 wherein means are provided associated with said reference body for measuring the temperature thereof.

15. A pyrometer for measuring the temperature of a partially transparent, partially reflecting object comprising a reference body, a first detector, means for directing a portion of the energy radiated by said reference body onto said first detector, means for directing another portion of the energy radiated by said reference body onto said object, a second detector, means for directing the energy of said reference body reflected by said object and the energy emitted by said object onto said second detector, a third detector, means for directing the energy of said reference body transmitted by said object onto said third detector, a first amplifier channel coupled to said first detector, a second and a third amplifier channel coupled to said second detector, a fourth amplifier channel coupled to said third detector, means for segregating said reflected radiation from said emitted radiation including chopper means interposed into the path of the radiation between said reference body and said object for periodically interrupting said reference body radiation, said second amplifier channel being responsive to the alternating signal developed by said interrupted and reflected radiation, said third amplifier channel being responsive to the direct current signal developed by said emitted radiation, means for adjusting independently the gains of said amplifier channels, and summing means for adding the signals of said second, third, and fourth amplifier channel, whereby the gains of said amplifier channels can be adjusted so that the signal of said first amplifier channel equals the sum of the signals of said second, third and fourth amplifier channel when the temperature of said reference body equals that of said object.

16. A pyrometer as defined in claim 15 wherein an inverter is provided in said first amplifier channel, and means coupled to said inverter and to said summing means for adding the inverted signal of said first amplifier channel to said signals to provide an output signal, whereby said output signal becomes zero when the temperature of said reference body equals that of said object.

17. A pyrometer as defined in claim 15 wherein an inverter is coupled to said first amplifier channel, and additional summing means coupling said inverter to said summing means, whereby the sum of the signals of said amplifier channels is zero when the temperature of said reference body equals that of said object.

18. A pyrometer as defined in claim 17 wherein means are provided associated with said reference body for controlling the temperature thereof, and means coupled to said additional summing means and to said means for controlling the temperature of said reference body for adjusting the temperature thereof until said sum of said signals becomes zero.

19. A pyrometer as defined in claim 15 wherein a synchronous, electronic chopper is provided in said third amplifier channel, said electronic chopper being synchronized with said chopper means disposed in the radiation path of said reference body so that the signal of said third amplifier channel represents substantially only the radiation emitted by said object.

20. A pyrometer as defined in claim 15 wherein an inverter is provided in said second amplifier channel, and means coupled to said inverter and to said third amplifier channel for adding the inverted signal of said second amplifier channel to that of said third amplifier channel, whereby the output signal developed by said third amplifier channel represents substantially only the radiation emitted by said object.

References Cited in the file of this patent

UNITED STATES PATENTS

| | | |
|---|---|---|
| 1,970,103 | Runaldue | Aug. 14, 1934 |
| 2,737,809 | Fastie | Mar. 13, 1956 |
| 2,844,033 | Tandler et al. | July 22, 1958 |
| 2,886,970 | Munker | May 19, 1959 |